Jan. 18, 1944.　　　　R. H. HILL　　　　2,339,698
DIRECTION SIGNALING SYSTEM
Filed Feb. 20, 1941　　　3 Sheets-Sheet 1
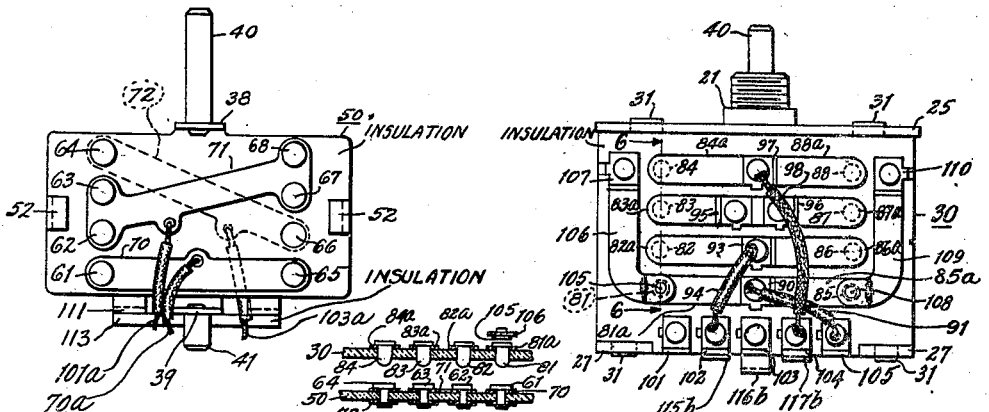
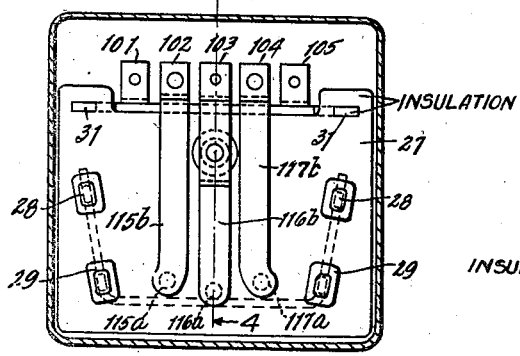
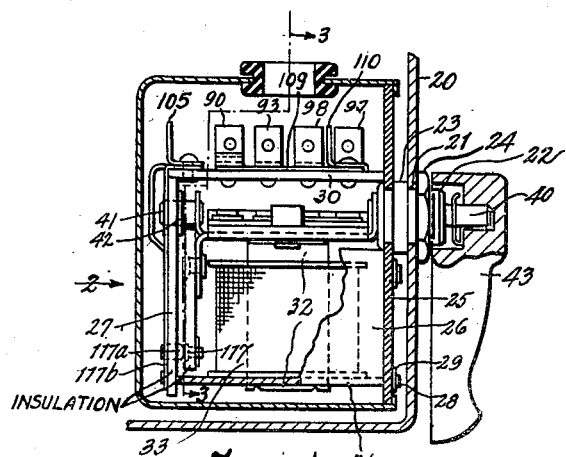
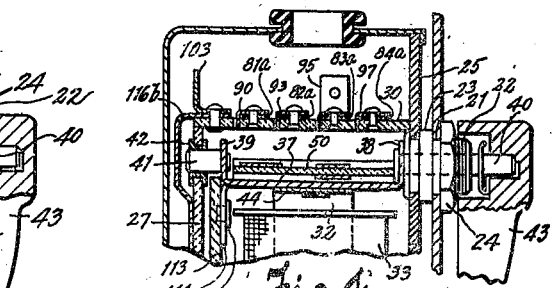
INVENTOR
Robert H. Hill
BY
Blackmore Spencer & Flint
his ATTORNEYS

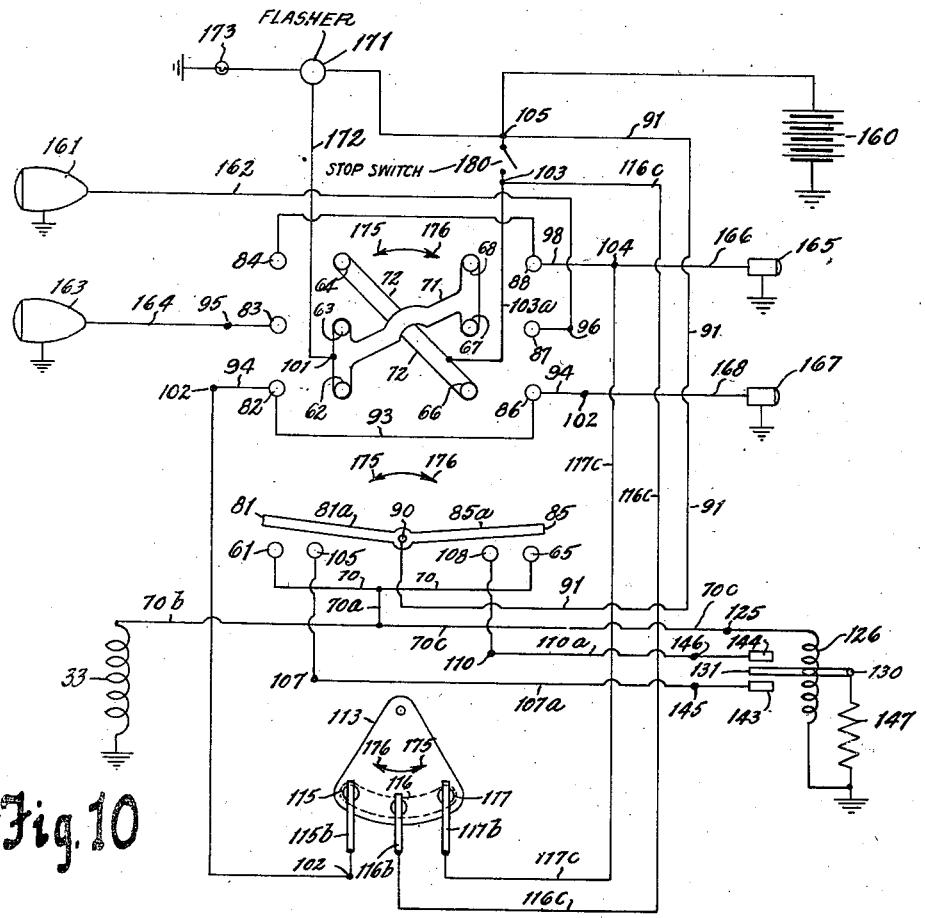

Jan. 18, 1944.  R. H. HILL  2,339,698
DIRECTION SIGNALING SYSTEM
Filed Feb. 20, 1941  3 Sheets-Sheet 3

INVENTOR
Robert H. Hill
BY Blackmore Spencer
and Flint
his ATTORNEYs

Patented Jan. 18, 1944

2,339,698

UNITED STATES PATENT OFFICE 2,339,698

DIRECTION SIGNALING SYSTEM

Robert H. Hill, Anderson, Ind., assignor to General Motors Corporation, Detroit, Mich., a corporation of Delaware Application February 20, 1941, Serial No. 379,767

3 Claims. (Cl. 177—337)

This invention relates to direction signals for automotive vehicles, for example, a signaling system employing a pair of signal lamps at the front of the car and a pair of signal lamps at the rear. The lamps are caused to burn by moving a manually operated switch handle in one direction or the other from neutral depending on the direction of the turn of the vehicle. The burning of the lamps on the right side of the car will indicate a right turn; and the burning of the lamps on the left side will indicate a left turn. In such a system, means may be provided whereby the application of brakes to the automobile is indicated by the burning of both the rear signal lamps.

It is an object of the present invention to provide the electrical means for retaining the manually operated turn-indicating control-switch in either of its operating positions, said electrical means being operative so long as the vehicle is being steered in that direction. But, when the steerng wheel is turned in the direction to cause the vehicle to make the opposite turn, the electrical means which holds the switch is immediately rendered inoperative so that the switch will return to neutral position. More specifically, the present invention provides that, when the signal control switch is moving into position for retaining a right turn, it will be automatically held in that position by an electromagnet which remains energized so long as the steering wheel has been turned to give a right turn and is not turned in the reverse direction beyond a predetermined amount. When the steering wheel is turned toward the left beyond a predetermined amount, the electromagnetic means is immediately deenergized so that the signal controlling switch may be returned by a spring to neutral position. A similar control of the switch is obtained when moving it into position for indicating a left turn.

While, in the disclosed embodiment of the invention, the switch control is applied to the system referred to in the first paragraph, it will be understood that the switch control can be applied to any system which uses a manually operated control switch above referred to.

Further objects and advantages of the present invention will be apparent from the following description, reference being had to the accompanying drawings wherein a preferred embodiment of the present invention is clearly shown.

In the drawings:

Figures 1 to 7 are views of the turn signal control switch provided with an electromagnetic means for retaining the switch in either of its control positions so long as the electromagnet is energized.

Figure 1 is a side view partly in section of the main control switch. In this view the switch support and switch housing are shown in section.

Figure 2 is an end view of the switch looking in the direction of arrow 2 of Figure 1, the switch housing being shown in section.

Figure 3 is a sectional view on the line of 3—3 of Figure 1.

Figure 4 is a fragmentary sectional view on line 4—4 of Figure 2.

Figure 5 is a plan view of the switch taken in the direction of the arrow 5 of Figure 3, the switch housing being omitted.

Figure 6 is a fragmentary sectional view on line 6—6 of Figure 5.

Figure 7 is a plan view of the movable switch contact assembly.

Figures 8 and 9 are views of a switch which is responsive to the turning of the steering wheel beyond a predetermined amount in a reverse direction for disabling the electromagnetic means of the switch shown in the Figures 1 to 7.

Figure 8 is a side view of the switch in cooperative relation with a rotating shaft operated by the steering gear mechanism. The switch support and the switch housing are shown in section.

Figure 9 is a view in the direction of the arrow 9 of Figure 8, the switch housing being shown in section.

Figures 10, 11 and 12 are similar wiring diagrams of a turn signal control circuit employing the switches shown in Figures 1 to 9.

Figure 10 shows the control circuit in neutral position.

Figure 11 shows the circuit in condition when signaling for a left turn.

Figure 12 shows the circuit in condition for signaling a right turn.

Figure 12:
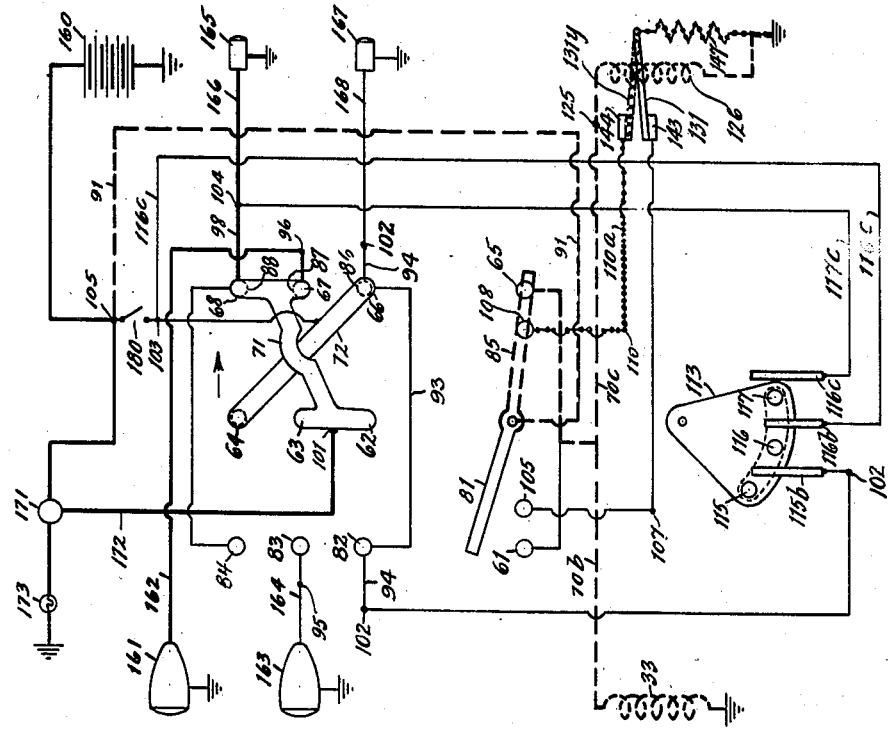

Referring to Figures 1 to 7, a housing 20 which may be of any suitable shape adapted to be clamped upon the automobile steering column is provided with a hole 21 for receiving a threaded bushing 22 having a shoulder 23 abutting the inside of the housing 20 and held there by a nut 24. Bushing 23 is secured by riveting to a metal plate 25 which supports a U shape magnetizable frame 26 which supports a non-conducting plate 27. The frame 26 is attached to the plates 25 and 27 by riveting of tangs 28 which are provided by the plate 26 and which extend through suitable openings in plates 25 and 27 and also through washers 29 (Figure 2). The plates 25 and 27 support a non-conducting plate 30 (Figures 2 and 5) having tangs 31 which extend through suitable openings in plates 25 and 27.

Magnetizable frame 26 supports a magnetizable core 32 surrounded by a magnet coil 33. The upper end or pole of core 32 is semi-cylindrical as indicated at 34. The pole 34 and poles 35 and 36 provided by frame 26 cooperate with an armature 37 having ears 38 and 39 by means of which it is mounted upon shafts 40 and 41 journalled, respectively in the bushing 21 and a bushing 42 carried by plate 27. Shaft 40 supports a handle 43 by which the armature 37 is turned in either direction to cause it to be brought into close proximity either to the pole 35 or to the pole 36. The armature 37 is normally held in neutral position shown in Figure 3 by a non-magnetizable spring 44 having its central portion secured by riveting to the central portion of the armature 37 and having end portions 45 and 46 received, respectively, by holes provided in the pole portions 35 and 36 of frame 26. Thus, rotation of the armature 37 in either direction from horizontal is opposed by spring 44.

Armature 37 carries a non-conducting plate 50 retained on shoulders 51 of armature 37 by the bending of ears 52 of the armature. Insulated plate 50 provides a support for a number of switch contacts and connecting straps, namely: contacts 61 and 65 connected by strap 70, contacts 62, 63, 67 and 68 connected by strap 71, and contacts 64 and 66 connected by strap 72 connected on the side of the plate 50 remote from straps 70 and 71.

Non-conducting plate 30 supports movable contact buttons 81 to 88 inclusive, engageable, respectively, with contacts 61 to 68 inclusive carried by plate 50. Each one of these contacts is movable relative to the plate 30 and is guided thereby by providing a hole in plate 30 to receive each one of these contacts. These contacts are resiliently mounted, respectively, upon flexible spring blades 81a to 88a inclusive. These blades are secured at their fixed portions to the plate 30 and to conducting terminal clips. Specifically, blades 81a and 85a are integral and are electrically connected with a clip 90 joined by a wire 91 with a terminal clip 105 on the lower edge of plate 30 as viewed in Figure 5. Blades 82a and 86a are integral and are electrically connected with a clip 93 connected by a wire 94 with a terminal 102. The blades 83a and 87a are separate and are connected, respectively with clips 95 and 96. The blades 84a and 88a are integral and are connected electrically with a clip 97 connected by wire 98 with a terminal clip 104.

Clips 102, 104 and 105 are located in a row along one edge of plate 30 together with clips 101 and 103. Clip 101 is used for making connection with a signal flasher switch 171 (Figure 10) and is connected by wire 101a with strap 71 on plate 50 (Figure 7). Terminal 103 is used for making connection with a stop light switch 180 (Figure 10) and is connected by wire 103a with strap 72 on plate 50. The wire 70a is attached to the strap 70 on plate 50. When contact 61 is caused to engage contact 81 responsive to movement of plate 50 (Figure 6) relative to plate 30, contact 81 is caused to engage contact 105 carried on spring blade 106 fastened to plate 30 and to a terminal 107. Similarly when contact 65 on plate 50 (Figure 7) is caused to engage contact 85 on plate 30 (Figure 5), contact 85 engages also a contact 108 carried by spring blade 109 fixed to the plate 30 and to a terminal clip 110.

Armature 37 is provided with downwardly extending ears 111 (Figure 3) attached by rivets 112 to a non-conducting plate 113 supporting on its back face an arcuate strap 114 connecting three contacts 115, 116 and 117 which normally engage contact buttons 115a, 116a, 117a, respectively, mounted on spring blades 115b, 116b and 117b, respectively, secured, respectively to terminals 102, 103 and 104. When the lever 43 is moved to turn the shaft 40 and the armature 37 in a clockwise direction as viewed in Figure 3, the following pairs of contacts will be engaged: 65—85, 66—86, 67—87, 68—88, 85—108; and contacts 115, 116 and 117 will be moved out of engagement with their respective contact buttons 115a, 116a and 117a. Movement of armature 37 in a counterclockwise direction will cause the following pairs of contacts to engage: 61—81, 62—82, 63—83, 64—84, and 81—105; and contacts 115, 116 and 117 will be again out of engagement with their respective contact buttons 115a, 116a and 117a. Whenever the armature is so moved, it will be held in that position due to the energization of magnet coil 33 in a manner to be described later. When this magnet coil is de-energized, the armature 37 will return to neutral position under the action of spring 44.

The means for effecting deenergization of coil 33 comprises the switch shown in Figures 8 and 9. A frame 120, which may be a part of the steering shaft housing, supports a bracket 121 to which is attached a non-conducting plate 122 which supports a magnet frame 123 attached by rivets 124 to plate 122 and to bracket 121. These rivets also secure a terminal plate 125 located between plate 122 and magnet frame 123 and insulated from these parts. Terminal 125 is connected with the non-grounded end of magnet coil 126, the other end being grounded upon a core 127 around which the magnet coil 126 is wound. Core 127 is supported by magnet frame 123 which is also insulated from ground and from the terminal 125. Therefore frame 123 may serve as a non-grounded conductor. Frame 123 provides a pivot 130 upon which a magnetizable armature 131 is mounted for movement in directions toward or away from the pole 127 and for movement in a direction across the face of pole 127. A spring 132 connecting an ear 133 of frame 123 with an ear 134 of the armature 131 normally holds the armature in the position 131a (Figure 8) away from the pole face 127. Armature 131 is held in a normally centered position by leaf springs 135 and 136 supported, respectively, by ears 137 and 138 provided by frame 123. Armature 131 carries contacts 141 and 142 adapted, respectively, to engage contacts 143 and 144 supported by terminals 145 and 146, respectively, insulated from each other and from ground by mounting them upon the insulating plate 122. Armature 131 carries a non-conducting button 150 for engagement with a disc or collar member provided by a shaft 152 which is rotated when the steering wheel is turned. A resistance element 147 is connected between armature 131 and ground as shown in Figure 10. As shown in Figure 8, resistance 147 is connected by screw 147a with a clip 147b attached to frame 123, thus making an electrical connection between one end of the resistance 147 and the armature 131. The lower end of the resistance 147 (as viewed in Figure 8) is connected by screw 148 with an ear 149 integral with the bracket 121, thus providing a connection between ground (the frame of the automobile) and one end of this resistance.

Referring to Figure 10 which shows the turn signal system in non-operating position, the right front signal light 161 is connected by wire 162 with terminal 96. The left front signal lamp 163 is connected by wire 164 with terminal 95. The right rear signal lamp 165 is connected by wire 166 with terminal 104. The left rear signal lamp 167 is connected by wire 168 with terminal 102. Terminal 105 is connected with battery 160 and with a flasher switch 171 which controls intermittent current flow from the battery 160 to the terminal 101 with which the flasher 171 is connected by wire 172. Whenever the flasher 171 operates to connect terminal 101 with battery 160, a flasher indicator lamp 173 burns. Lamp 173 is connected between flasher 161 and ground. A stop light switch 180 is connected between terminals 103 and 105 in order that lamps 165 and 167 may burn to indicate that the brakes have been applied, such indication being possible only when the signal system is not being used to indicate a turn in either direction.

Wire 70a connected with strap 70 (Figure 7) is connected by wires 70b and 70c, respectively, with the non-grounded end of magnet coil 33 (of the switch of Figures 1 to 7) and with terminal 125 (of the switch of Figures 8 and 9). Terminal 107 (Figure 5) is connected by wire 107a with terminal 145 (Figure 9). Terminal 110 is connected by wire 110a with terminal 146.

When the system is in the condition shown in Figure 10, in which the turn signal switch of Figures 1 to 8 is neutral position, whenever the stop light switch 180 is closed, the rear indicating lamps 165 and 167 will be connected with the battery 160 through the following circuits: terminal 105, switch 180, terminal 103, wire 116c, contact blade 116b, contact 116 connected with strap 114 which is connected with contacts 115 and 117. Contact 115 is connected with lamp 167 through contact 115a and terminal 102. Contact 117a is connected by wire 117c, terminal 104 and wire 166 with lamp 165.

Figure 11:
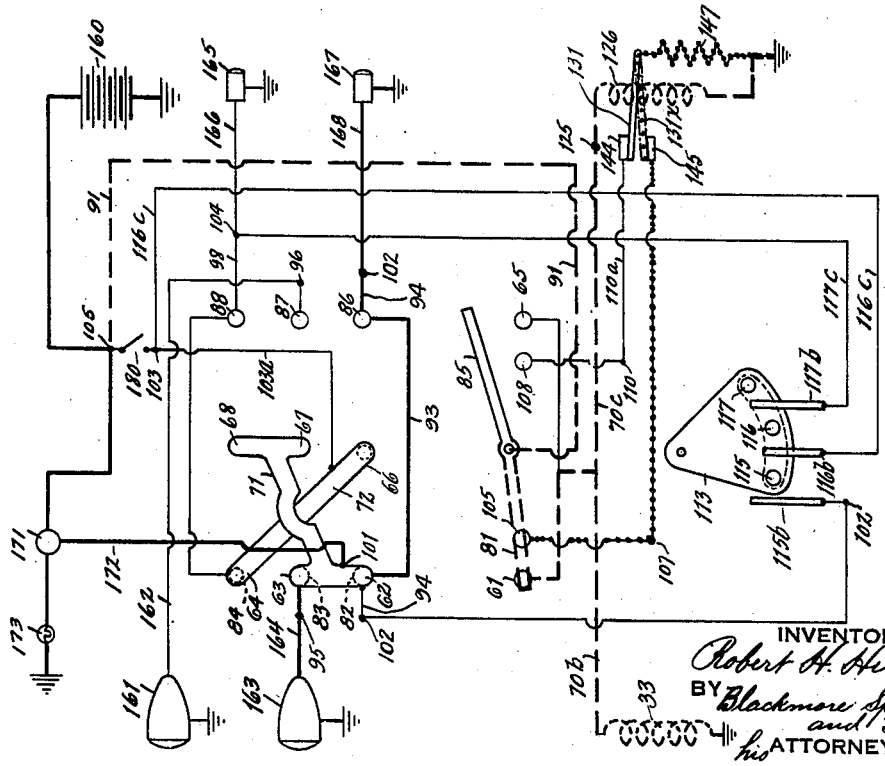

Figure 11 shows the system in condition for signaling a left hand turn. The armature 37 has been rotated counterclockwise as indicated by arrowheads 175 in Figure 10 in order to effect the engagement of the following groups of contacts: 84—64, 83—63, 82—62, 81—61—105. At this time, contacts 115, 116, 117 will be separated from contacts 115a, 116a and 117a. The left front and rear signal lamps 163 and 167 will burn intermittently to give a flashing signal, this circuit being indicated in heavy black lines in Figure 11. At the same time, the magnet coils 33 and 126 are energized as indicated by the circuit shown in heavy dash lines. The energizaton of magnet 33 will cause armature 37 to be maintained in such position as to connect contacts 61, 81 and 105. The energization of magnet coil 126 causes armature 127 (Figure 8) to move toward the left to urge button 150 to engage collar 151. When the shaft 152 is turned as a result of turning the steering wheel to make a left-hand turn, the armature 131 will be moved by the shaft 152 in such direction as to make contact with the stationary contact 144. In the arrangement of parts disclosed in Figures 8 and 9 the shaft 152 is rotated counterclockwise as indicated by arrow 152—1 when the steering wheel is turned to make a left turn. This causes armature contact 142 to engage contact 144 which merely acts as a stop to limit further movement of contact 142 from right toward left (Figure 9) or up (Figure 11). When the steering wheel is turned in the opposite direction beyond a predetermined amount as when straightening up the front wheels of the car, the armature 131 will be rotated in the opposite direction to cause it to move into the position 131x in which it engages contact 145 (Figure 11), thereby establishing a by-pass around the magnet coils 33 and 126 to ground. This by-pass includes resistance 147 as indicated by the heavy dotted line in Figure 11. Coils 33 and 126 having been shorted out, armatures 37 and 131 are spring returned to the normal positions shown in Figure 10.

Should the brake be operated while a left turn is being indicated the right rear signal 165 is caused to burn steadily, being supplied with current from battery 160, through terminal 105, stop light switch 180, terminal 103, wire 103a, strap 72 on plate 50, contact 64, contact button 84, wire 200, contact button 88, wire 98, terminal 104, and wire 166.

When indicating that a right turn is to be made, the operator turns the handle 43 to move the armature 37 (Figure 3) clockwise and to move switch parts in a clockwise direction as indicated by the arrowheads 176 in Figure 10 thereby causing the engagement of the following groups of contacts: 68—88, 67—87, 66—86, 65—85—108. At the same time, contacts 115, 116 and 117 will be separated from contacts 115a, 116a and 117a. The turning of armature 37 clockwise will cause the right front and right rear signal lamps 161 and 165 to be connected with the battery 160 and flasher 171 through the circuit shown in heavy black lines. At the same time, the magnet coils 33 and 126 will be energized through the circuit shown in heavy dash lines. Armature 37 will, therefore, be held in this position so long as coil 33 is energized. The energization of coil 126 causes armature 131 to be attracted and rotation of shaft 152 in the clockwise direction as indicated by arrow 152r (Figure 9) as a result of turning the steering wheel indicating a right turn, will cause armature 131 to be rotated by shaft 152 in a direction from left toward right (Figure 9) thereby causing armature contact 141 to engage contact 143. This position of armature 131 is indicated in full lines in Figure 12. When straightening up the front wheels on coming out of a right-hand-turn, the shaft 152 will be rotated counterclockwise beyond a predetermined amount thereby causing armature 131 to move into position 131y (Figure 12) thereby establishing a by-pass indicated in dot-lines around the coils 33 and 126. Coils 33 and 126 having been shorted out, armatures 37 and 131 will return to normal position and the signal lamps will cease to burn.

Should the brake be operated while a right turn is being indicated the left rear signal 167 is caused to burn steadily, being supplied with current from battery 160 through terminal 105, stop light switch 180, terminal 103, wire 103a, strap 72, contact 66, contact button 86, wire 94, terminal 102, and wire 168.

While the embodiments of the present invention as herein disclosed, constitute a preferred form, it is to be understood that other forms might be adopted, all coming within the scope of the claims which follow.

I claim:

1. In a direction signal system for vehicles the combination of a plurality of electrically operated front and rear signals, a direction signal circuit including a source of current, a flasher, a manually operable direction signal switch having a right turn position in which current is supplied to the right turn signals and a left turn position in which current is supplied to the left turn signals and an intermediate off position, means yieldingly urging the switch toward off position, a holding circuit for said switch including said source, means for holding the switch in turn-indicating position, circuit closing means actuated by moving said switch to turn-indicating position, and means for deenergizing said circuit to release said holding means and permit said switch to return to off position comprising means adapted to be moved into operative connection with the steering mechanism, and means actuated by movement of said last-named means in response to movement of the steering mechanism in reverse direction adapted to deenergize said holding circuit, and a stop signal circuit including said source, said rear signals, a stop signal switch and switch means adapted to supply current from said battery to both of said rear signals when the direction signal switch is in off position and the stop signal switch is closed, said switch means being adapted to be actuated by movement of the direction signal switch to indicating position to supply current to the rear signal on the side away from the turn when the direction signal switch is in direction indicating position and the stop signal switch is closed.

2. In a direction signal circuit, the combination of a pair of signals, a direction signal circuit including a source of current, an operator controlled direction signal switch having a right turn position in which current is supplied to the right turn signals, a left turn position in which current is supplied to the left turn signals and an intermediate off position, means for yieldingly urging the switch toward off position, a holding circuit for such switch including said source, electromagnetic means for holding the switch in turn-indicating position, and circuit closing means actuated by moving said switch to turn indicating position, and means for deenergizing said holding circuit to release said electromagnetic holding means and permit said switch to return to off position comprising a low resistance circuit in parallel with said electromagnetic holding means, and means operated by reverse rotation of the steering mechanism after making the turn for closing said parallel circuit, and a stop signal circuit including said source, said signals, a stop signal switch, and switch means adapted to supply current from said battery to said rear signals when the direction signal switch is in off position and the stop signal switch is closed, said switch means being adapted to be actuated by movement of the direction signal switch to direction indicating position to supply current to the rear signal on the side only away from the turn when the direction signal switch is in direction indicating position and the stop signal switch is closed.

3. In a direction signal circuit, the combination of a pair of signals, a direction signal circuit including a source of current, an interrupter, an operator controlled direction signal switch having a right turn position in which current is supplied intermittently to the right turn signals, a left turn position in which current is supplied intermittently to the left turn signals and an intermediate off position, means for yieldingly urging the switch toward off position, a holding circuit for such switch including said source, electromagnetic means for holding the switch in turn-indicating position, and circuit closing means actuated by moving said switch to turn indicating position, and means for deenergizing said holding circuit to release said electromagnetic holding means and permit said switch to return to off position comprising a low resistance circuit in parallel with said electromagnetic holding means, and means operated by reverse rotation of the steering mechanism after making the turn for closing said parallel circuit, and a stop signal circuit including said source, said signals, a stop signal switch, and switch means adapted to supply current from said battery to said signals when the direction signal switch is in off position and the stop signal switch is closed, said switch means being adapted to be actuated by movement of the direction signal switch to direction indicating position to supply current to the signal on the side only away from the turn when the direction signal switch is in direction indicating position and the stop signal switch is closed.

ROBERT H. HILL.